United States Patent [19]
Bristol

[11] 3,792,381
[45] Feb. 12, 1974

[54] SURFACE-WAVE ELECTRO-ACOUSTIC TRANSDUCER

[75] Inventor: Thomas W. Bristol, Orange, Calif.

[73] Assignee: Hughes Aircraft Corporation, Culver City, Calif.

[22] Filed: Feb. 20, 1973

[21] Appl. No.: 334,180

[52] U.S. Cl. .................. 333/72, 333/30 R, 310/9.8
[51] Int. Cl. ........ H03h 9/04, H03h 9/26, H03h 9/30
[58] Field of Search ....... 333/72, 30 R; 310/9.7, 9.8

[56] References Cited
UNITED STATES PATENTS
3,747,256  9/1973  Whitehouse et al. ............. 333/30 R OTHER PUBLICATIONS
Tancrell et al., "Acoustic Surface Wave Filters" in Proceedings of the IEEE, Vol. 59, No. 3, March 1971, pp. 393–409.

Primary Examiner—James W. Lawrence
Assistant Examiner—Marvin Nussbaum
Attorney, Agent, or Firm—Robert H. Himes

[57] ABSTRACT

A family of surface-wave electro-acoustic transducers is realized that provide a large class of response functions that combine the smooth spectral characteristics which are unique to periodic transducers, and that possess a minimum of acoustic diffraction effects which are unique to unapodized transducers. In particular, an unapodized central array on a piezoelectric substrate is flanked by an identical pair of similar but smaller unapodized arrays of the same periodicity as that of the central array. The flanking arrays are spaced within one wavelength of, and in a phase reversal relationship with the central array. The configuration of the spectral response function is varied by adjusting the ratio of the number of sources in each of the flanking arrays to the number of sources in the central array. A source is defined as being distributed between a pair of electrodes of opposite polarity.

8 Claims, 6 Drawing Figures

Phase Reversal Transducer

3,792,381
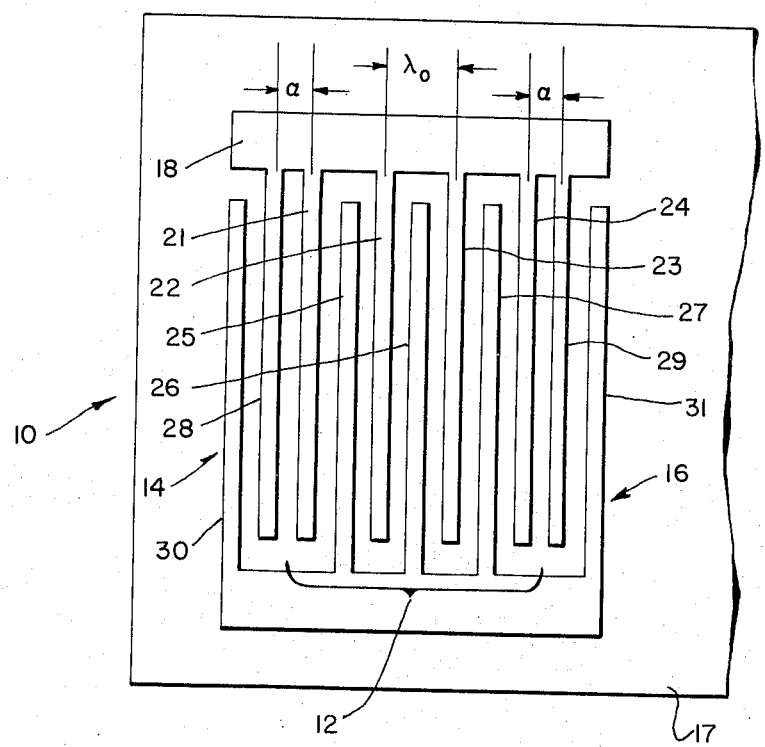
Fig. 1. Phase Reversal Transducer
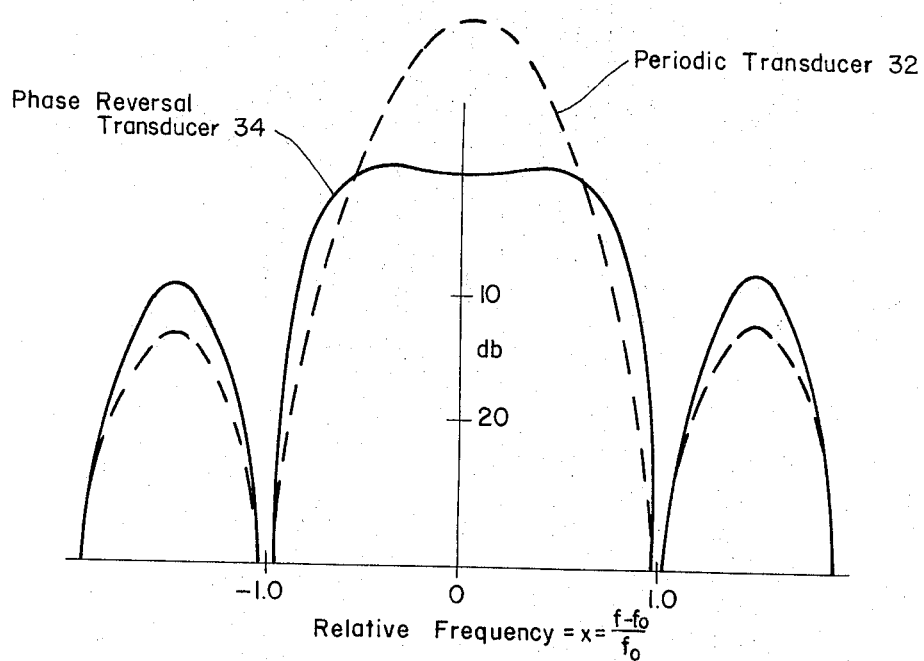
Fig. 2.

SURFACE-WAVE ELECTRO-ACOUSTIC TRANSDUCER

BACKGROUND OF THE INVENTION

U.S. Pat. No. 3,663,899 teaches the use of an apodized central array in conjunction with phase reversal in flanking apodized arrays to synthesize desired spectral response characteristics. The use of such a transducer, however, is restricted for two reasons. First, since the acoustic diffraction loss of the radiation from the samller apertures increases more rapidly with delay, the far-field responses of apodized transducers vary with delay. This is unacceptable for applications in which multiple, identical replicas of a signal, differing only in delay time, are required as, for example, in an analog multiple target indicator. The second problem is that accurate analysis is cumbersome, and is only valid in the near field diffraction region. In contrast, the diffraction loss for an unapodized transducer is essentially the same for all radiating acoustic sources except for very long transducers, and accurate analysis is readily accomplished using conventional transducer models.

Techniques for synthesizing response functions using nonlinear FM transducer gratings (variable electrode spacing) have been developed. FM transducers, however, have three deficiencies which are sometimes significant. First, an FM transducer must be used with a conjugate transducer, that is, its time reversed replica, in order to realize a linear phase response. In many applications, a single nondispersive transducer is required. Second, inherent Fresnel ripples in their response are intolerable for some applications, and third, such transducers utilize numerous electrodes, which can complicate fabrication. None of these deficiencies ordinarily exist for periodic transducers. Only symmetry (even or odd) with respect to the transducer centerline is required for a linear acoustic phase response. Spectral responses can be made arbitrarily smooth and the number of electrode pairs is typically in the order of the inverse of the fractional bandwidth.

Heretofore, the problem with periodic unapodized transducers has been that only a few types of responses were realized. The amplitude response of the conventional uniform periodic transducer is of the form $\sin x/x$ which is of limited value for wideband applications.

SUMMARY OF THE INVENTION

In accordance with the invention, a surface-wave electro-acoustic transducer is provided by a central periodic unapodized array on a piezoelectric substrate which typically has a spectral reponse of the form $\sin x/x$ and a bandwidth that is inversely proportional to the length of the array. This central periodic array is flanked by an identical pair of smaller unapodized arrays of the same periodicity but which are nominally 180° out of phase with the central array. Since the flanking arrays are in a phase reversal relationship with the central array, their combined spectral response subtracts from that of the central array. Since the bandwidth of the flanking arrays are narrower than that of the central array, the overall response toward the center of the spectrum is reduced while not significantly affecting it near the band edges. This enables the composite response to be made uniform with a wider fractional bandwidth compared to that of a single periodic section. The composite response can be modified by varying the width and position of the flanking phase reversed arrays compared to the center array.

BRIEF DESCRIPTION OF THE DRAWINGS

FIG. 1 illustrates the electrode arrangement of the phase reversal transducer of the present invention;

FIG. 2 is a comparison of amplitude responses of the phase reversal transducer of FIG. 1 and a conventional periodic transducer;

DESCRIPTION

Figure 3:
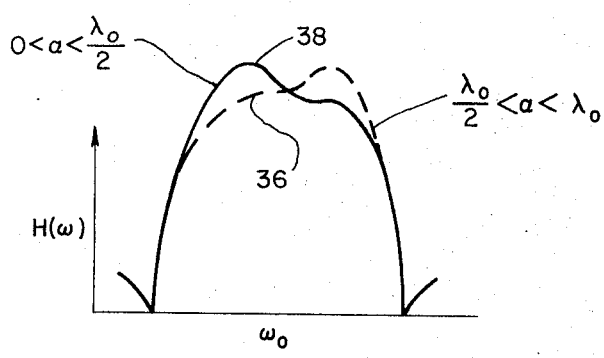
FIG. 3 shows amplitude response characteristic for spacing of the phase reversal arrays smaller than and greater than an odd multiple of one-half acoustic wavelength.

Referring to FIG. 1, there is depicted a phase reversal transducer 10 in accordance with the present invention having a central interdigitated transducer 12 flanked by interdigitated transducers 14,16 in a phase reversal relationship all on a piezoelectric substrate 17 such as, for example, YZ lithium niobate. More particularly, transducer 10 includes parallel coextensive spaced-apart electrodes 18,20 disposed on the substrate 17. Central interdigitated transducer 12 includes for example, an even number of periodic finger-shaped electrodes 21, 22, 23, 24 spaced at one wavelength intervals between centers at the mean frequency of operation and extending normally form electrode 18 towards electrode 20. The length of finger-shaped electrodes 21–24 is uniform and of the order of 100 wavelengths long. Centered between and of the same length as the electrodes 21, 22, 23, 24 are finger-shaped electrodes 25, 26, 27 extending from the electrode 20 towards electrode 18 thereby forming six source areas.

Next, the flanking transducers 14,16 are first formed by finger-shaped electrodes 28,29 of the same length as electrodes 21–27 disposed adjacent the outboard electrodes 21,24 of the central transducer 12 and extending from electrode 18 towards electrode 20. Additional electrodes spaced one-half wavelength between centers and of the same length alternately extend from electrode 20 and then from electrode 18. In the example depicted, a final pair of electrodes 30,31 extend from the electrode 20 on the outside of electrodes 28,29, respectively, towards the electrode 18. As designated in the drawing, the distance between adjacent finger-shaped electrodes from the same electrode 18 or 20 is one wavelength, $\lambda_o$, at the mean frequency of operation, $f_o$, whereby the distance between centers of adjacent electrodes in the same interdigitated transducer 12,14 or 16 is one-half wavelength, $\lambda_o/2$. The number of finger-shaped electrodes in the flanking transducers 14,16 is no less than two, thereby providing at least one source. The actual number of sources is selected to give the desired amplitude response characteristic for the composite transducer 10, as will be hereinafter illustrated. In order to avoid a negative response, the total number of sources in the transducers 14,16 is normally kept less than the number of sources in the central transducer 12.

Referring now to the particular example depicted in FIG. 1, the central transducer 12 has six sources between the finger-shaped electrodes 21-24 and 25-27 to comprise a uniform periodic transducer having the spectral response $$H_1(\omega) \; 3A \sin (3x)/3x \qquad (1)$$

where $A$ = constant amplitude factor $x = (\omega - \omega_o)/\omega_o$ $\omega = 2\pi f$ $\omega_o = 2\pi f_o = 2\pi v/\lambda_o$ where $v$ = surface wave velocity. This amplitude response is illustrated by dashed line 32 in FIG. 2. The excitation field between electrodes 21,28 and 24,29 of like polarity is essentially zero, so the acoustic source is assumed to be zero in these regions. The contributions of the remaining sources in transducers 14,16 depend on the value of $\alpha$. When $\alpha = 0$, the composite transducer 10 reduces to a uniform periodic transducer, in this case with eight sources. However, when $\alpha = \lambda_o/2$, the phases of the end sources of transducers 14 and 16 are reversed, compared to a continuous periodic array, and the response becomes:

$$H_2(a) = 3A \sin (3x)/3x + 4A \sin (4x)/4x - 5A \sin (5x)/5x \qquad (2)$$

This amplitude response is illustrated by the solid line 34 in FIG. 2. At midband ($\omega=\omega_o$), the relative amplitude of response characteristic 34 is reduced to approximately two-thirds that of the response characteristic 32 for the central transducer 12 alone. The large negative term of equation (2) has a relatively narrow bandwidth, so that near the band edge the overall response is broadened compared to the response of the central transducer 12. The "flatness" of the in-band response of amplitude response 34 is controlled by the ratio of the number of "phase-reversed" sources provided by transducers 14,16 to the number of sources in the central transducer 12. A substantially flat response is obtained when this ratio is in the range of from 20-40 percent.

For values of $\alpha$ between zero and $\lambda_o$ other than $\lambda_o/2$, the amplitude response is tilted as shown in FIG. 3. Referring to FIG. 3, the amplitude response characteristic for $\lambda_o/2 < \alpha < \lambda_o$ is tilted to the right, as shown in the drawing, and is depicted by dashed line 36. The amplitude response characteristic for $0 < \alpha < \lambda_o/2$, on the other hand, is tilted to the left, as shown in the drawing, and is depicted by solid line 38. This "rollup characteristic" is especially useful for compensating for frequency dependent propagation losses.

Figure 4:
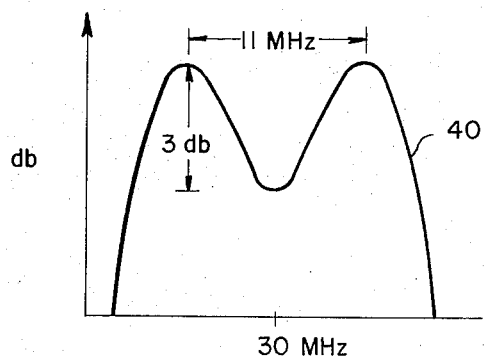
FIG. 4 shows an amplitude response characteristic of a delay line consisting of a pair of identical phase reversal transducers designed to have a $3db$ midband dip.

A midband dip can be achieved by adding additional sources to the phase reversed transducers 14,16 to produce an amplitude response characteristic 40, FIG. 4. A characteristic of this type is desirable for improving the efficiency of pulse expansion filters, as will be hereinafter explained in connection with FIGS. 5 and 6.

Figure 5:
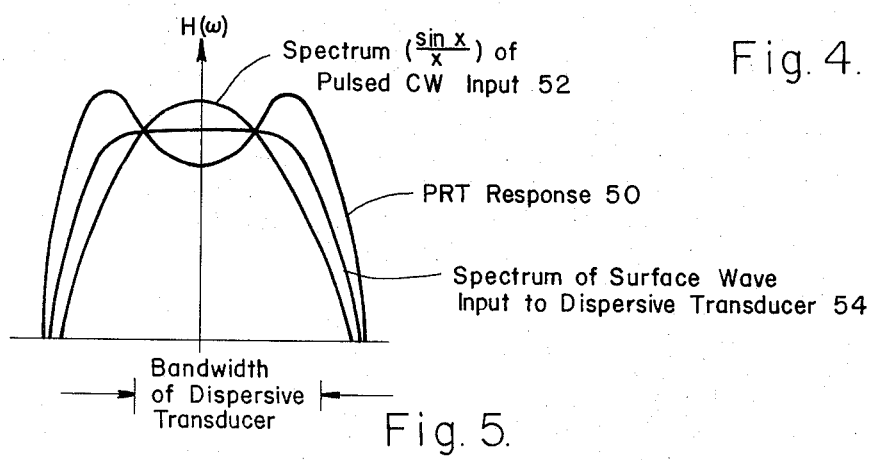
FIG. 5 is a schematic diagram of a phase reversal transducer with a midband dip used in conjunction with a dispersive transducer.
Figure 6:
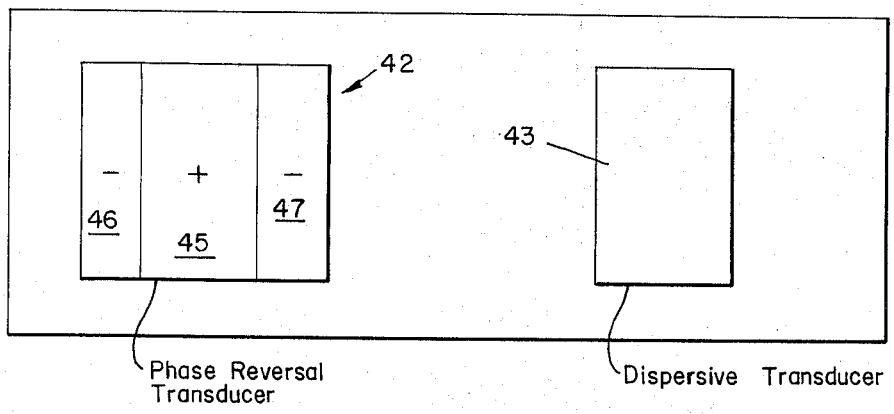
FIG. 6 illustrates how the amplitude response characteristics of the phase reversal transducer of FIG. 5 compensates for the spectral shape of the input pulse to provide a uniform spectral excitation of a dispersive transducer.

Referring to FIG. 5, a phase reversal transducer 42 and a dispersive transducer 43 are disposed in spaced relationship on a piezoelectric substrate 44 with the dispersive transducer 44 located and oriented to pick up an acoustic wave launched by the phase reversal transducer 42. The phase reversal transducer 42 includes a central interdigitated transducer 45 flanked by identical interdigitated transducers 46,47 in phase reversal relationship with the spacing between centers of adjacent finger-shaped electrodes connected to a common input electrode equal to one-half wavelength, i.e., spacing designated by $\alpha$ in FIG. 1 is equal to $\lambda_o/2$. Further, the combined number of sources in transducers 46,47 approximate 60 percent of the sources included in transducer 45 whereby the amplitude response is depicted by a characteristic 50, FIG. 6, which dips in the center. The phase reversal transducer 42 is normally excited with a rectangular continuous-wave pulse which has a $\sin x/x$ spectra depicted by characteristic 52, FIG. 6. The midband dip of the phase reversal transducer 42 compensates for the rounded spectrum 52 of a broader input pulse resulting in the spectrum 54 of the surface wave which excites the dispersive transducer 43 being relatively uniform, for minimum distortion, and having most of the pulse spectral energy within the filter passband for maximum efficiency. In contrast to the above, a conventional uniform periodic transducer used in place of the phase reversal transducer with a midband dip would have an amplitude response which approximates $\sin (x)/x$ making the spectrum of the surface input to the dispersive transducer 43 equal to $[\sin(x)/x]^2$. This latter spectrum, i.e., $[\sin(x)/x]^2$ is sharper and hence less uniform than $\sin (x)/x$ and, in addition, has substantial portions outside of the bandwidth of the dispersive transducer 43.

What is claimed is:

1. A surface-wave electro-acoustic transducer adapted to operate within a predetermined passband having a mean frequency, $f_o$, said transducer comprising a piezo-electric substrate, first and second parallel spaced electrodes disposed coextensively on said substrate; a plurality of no less than three finger-shaped electrodes of uniform length spaced at one wavelength, $\lambda_o$, between centers at said frequency, $\lambda_o$, extending normally from said first electrode towards said second electrode on said substrate; a finger-shaped electrode of said uniform length extending normally from said second electrode on said substrate intermediate each adjacent pair of said no less than three finger-shaped electrodes extending normally from said first electrode thereby to provide a first interdigitated transducer; first and second additional finger-shaped electrodes of said uniform length extending from said first electrode parallel to and a distance $\alpha$ from the exterior finger-shaped electrodes of said first transducer wherein $\alpha$ is greater than zero and less than $\lambda_o$; and third and fourth additional finger-shaped electrodes of said uniform length extending normally from said second electrode and spaced $\lambda_o/2$ between centers from said first and second additional finger-shaped electrodes, respectively, at locations farthest from said first transducer thereby to provide second and third interdigitated transducers in phase reversal relationship with said first transducer.

2. The surface-wave electro-acoustic transducer as defined in claim 1 wherein $\alpha$ is equal to $\lambda_o/2$.

3. The surface-wave electro-acoustic transducer as defined in claim 1 wherein $\alpha$ is less than $\alpha_o/2$ but greater than zero.

4. The surface-wave electro-acoustic transducer as defined in claim 1 wherein $\alpha$ is greater than $\lambda_o/2$ and less than $\lambda_o$.

5. An interdigital surface wave composite transducer adapted to operate throughout a band having a mean frequency, $f_o$ and a corresponding wavelength $\lambda_o$ along said substrate, said transducer comprising a piezoelectric substrate; first and second parallel spaced-apart coextensive electrical pads on said substrate, a central electro-acoustic section defined by a first array of electrodes of predetermined length commonly connected to said first electrical pad and a second array of electrodes of said predetermined length commonly connected to said second electrical pad, said first and second arrays of electrodes being interleaved to form an interdigitated pattern that defines a preselected number of equal width electric field interaction regions in the surface of said substrate; first and second identical electro-acoustic sections disposed on opposite sides of said central electro-acoustic section and spaced one-half wavelength, $\lambda_o/2$, therefrom, said first and second identical electro-acoustic sections including third and fourth identical arrays of electrodes of said predetermined length commonly connected to the same first or second electrical pad as connects the outermost electrodes of said central electro-acoustic section, respectively, and fifth and sixth arrays of electrodes of said predetermined length interleaved with said third and fourth arrays, respectively, and commonly connected to the remaining one of said first or second electrical pad that is not commonly connected to said third and fourth arrays, respectively, said third and fifth arrays and said fourth and sixth arrays each forming interdigitated patterns that define equal numbers each less than one-half said preselected number of electric field interaction regions of said equal width in the surface of said substrate whereby the midband response of said central electro-acoustic section is decreased.

6. A surface-wave electro-acoustic phase reversal unapodized transducer adapted to operate within a predetermined band having a means frequency, $f_o$, said transducer comprising means for providing a piezoelectric substrate; first and second parallel spaced electrical pads disposed coextensively on said substrate; means including $(n+1)$ finger-shaped electrodes of a predetermined length spaced one-half wavelength, at said frequency $f_o$, along said substrate and connected to said first and second electrical pads for providing a central electro-acoustic transducer having n sources where n is a positive integer no less than three; and means including no more than $(n+1)$ finger-shaped electrodes of said predetermined length spaced one-half wavelength at said frequency, $f_o$, along said substrate and connected to said first and second electrical pads for providing first and second electro-acoustic transducers each having the same number of sources on opposite sides of said central transducer, the adjacent finger-shaped electrodes between said first transducer and said central transducer and between said central transducer and said second transducer being spaced one-half wavelength along said substrate between centers at said frequency, $f_o$, and being connected to the same first or second electrical pad.

7. The surface-wave electro-acoustical phase reversal unapodized transducer as defined in claim 6 having a response characteristic with a midband dip and an additional dispersive transducer disposed on said substrate spaced from and in a position to receive acoustic waves launched by said phase reversal transducer thereby to provide a high efficiency pulse expansion filter.

8. A high efficiency pulse expansion filter adapted to operate within a predetermined band having a mean frequency, $f_o$, said filter comprising means for providing a piezoelectric substrate; an unapodized phase reversal transducer disposed on said substrate having a midband dip and adapted to be energized with a continuous wave pulsed input for transmitting an acoustic wave in a predetermined direction along said substrate; and a dispersive transducer disposed on said substrate in a position to receive said acoustic wave and spaced from said unapodized phase reversal transducer.

* * * * *